United States Patent
Ram et al.

(10) Patent No.: US 12,389,319 B2
(45) Date of Patent: Aug. 12, 2025

(54) POWER MANAGEMENT FOR VIRTUALIZED RAN

(71) Applicant: Hewlett Packard Enterprise Development LP, Houston, TX (US)

(72) Inventors: Geetha Ram, Plano, TX (US); Rodion Naurzalin, Mississauga (CA); Chengappa Munjandira, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 432 days.

(21) Appl. No.: 17/813,821

(22) Filed: Jul. 20, 2022

(65) Prior Publication Data
US 2024/0007946 A1    Jan. 4, 2024

(30) Foreign Application Priority Data
Jun. 30, 2022 (IN) .............................. 202241037709

(51) Int. Cl.
*H04W 52/02*   (2009.01)
*H04L 41/046*  (2022.01)

(52) U.S. Cl.
CPC ....... *H04W 52/0206* (2013.01); *H04L 41/046* (2013.01)

(58) Field of Classification Search
CPC .......... H04W 52/0206; H04W 52/0203; H04L 41/046; H04L 41/40; H04L 41/0816; H04L 41/344; H04L 43/08
USPC ....................................................... 370/318
See application file for complete search history.

(56) References Cited

U.S. PATENT DOCUMENTS

| | | |
|---|---|---|
| 10,411,656 B1 | 9/2019 | Pick et al. |
| 10,498,659 B2 | 12/2019 | Bull et al. |
| 10,715,702 B1 | 7/2020 | Zhao et al. |
| 10,944,444 B2 | 3/2021 | Dick et al. |
| 11,039,383 B2 | 6/2021 | Mukherjee et al. |
| 2020/0110627 A1 | 4/2020 | Chou et al. |

(Continued)

FOREIGN PATENT DOCUMENTS

| | | |
|---|---|---|
| WO | 2018232746 A1 | 12/2018 |
| WO | 2020/068414 A1 | 4/2020 |
| WO | 2021/089114 A1 | 5/2021 |

*Primary Examiner* — Mang Hang Yeung
(74) *Attorney, Agent, or Firm* — Hewlett Packard Enterprise Patent Department

(57) ABSTRACT

A dynamic, context-specific power dormancy and management architecture for virtualized RANs that include a PHY layer on an expansion card. The architecture includes (1) a power control agent in a programmable environment on the expansion card that obtains data from subcomponents in the programmable environment on the expansion card, correlates the data to at least a first power control policy stored at the expansion card, implements the correlated first power control policy on the expansion card; and facilitates communication of the selected correlation data and/or raw data to a non-transitory computer-readable medium at a data center; (2) a Power Control Policy Function at the data center where data is obtained from vRAN infrastructure and optimized power control policies that may be shared with the vRANs are developed; and (3) an out of band management channel that allows for direct communication between the power control agent and the data center.

20 Claims, 7 Drawing Sheets

(56) References Cited

U.S. PATENT DOCUMENTS

| | | |
|---|---|---|
| 2020/0296741 A1 | 9/2020 | Ayala Romero et al. |
| 2021/0377064 A1 | 12/2021 | O'Keeffe et al. |
| 2022/0159785 A1 | 5/2022 | Foukas et al. |
| 2022/0283976 A1* | 9/2022 | Long .................. G06F 13/4081 |
| 2024/0259879 A1* | 8/2024 | Ranganath .......... H04L 41/5054 |

* cited by examiner

POWER MANAGEMENT FOR VIRTUALIZED RAN

BACKGROUND

Radio Access Network (RAN) infrastructure is used in mobile telecommunication networks, such as mobile broadband networks, to connect user equipment (UE) to a core network. RANs handle functions such as radio signal processing, radio resource control, and processing signaling for a subscriber to use the services of the core network. Recently, RAN technology has been virtualized so that the technology may be run on general purpose compute platforms in conjunction with various functional components.

BRIEF DESCRIPTION OF THE DRAWINGS

Various objects, features, aspects and advantages of the inventive subject matter will become more apparent from the following specification, along with the accompanying drawings in which like numerals represent like components.

Figure 1:
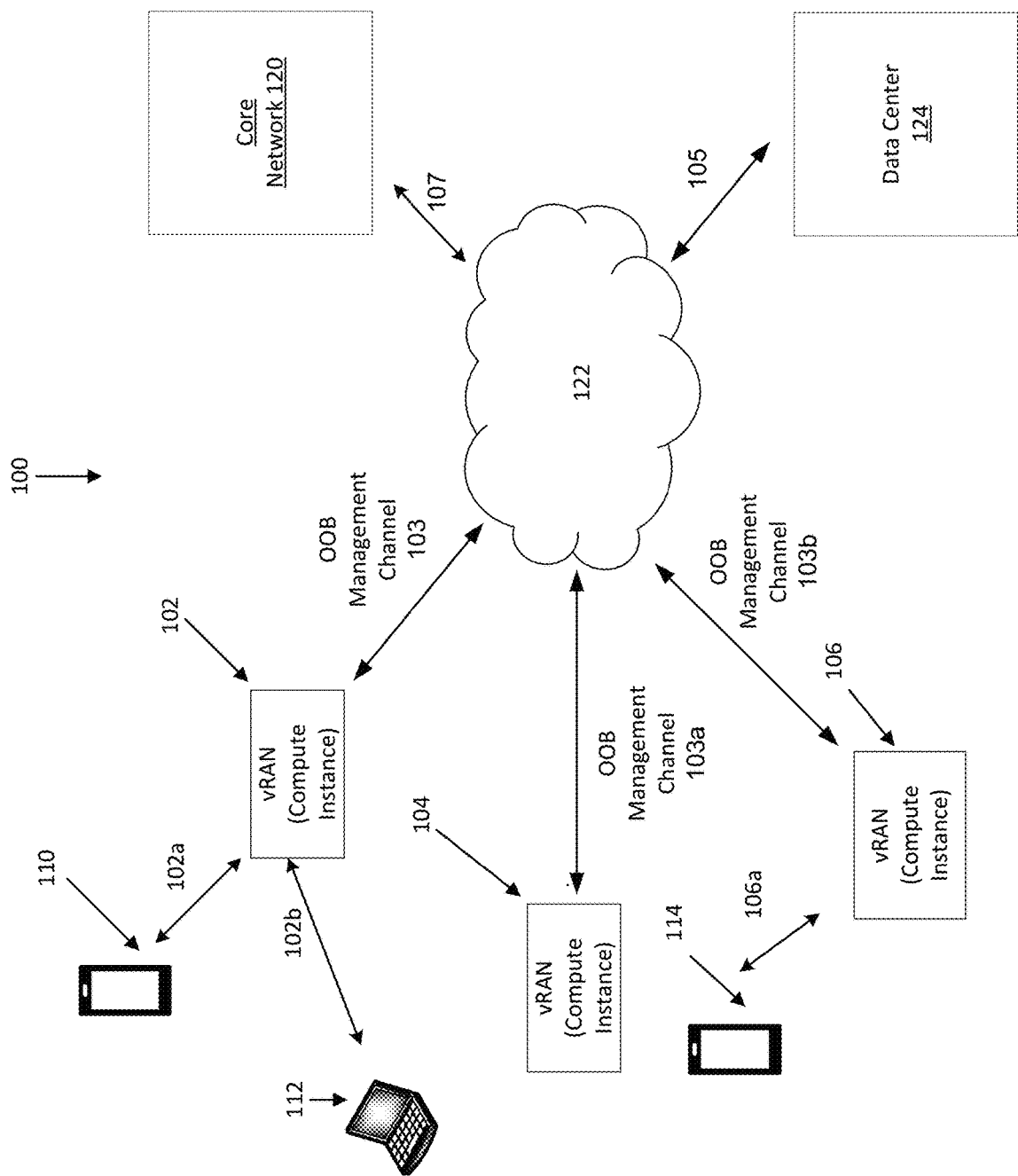
FIG. 1 illustrates an overview diagram of a system of vRANs that may communicate via a network in accordance with an example.

While the examples are described with reference to the above drawings, the drawings are intended to be illustrative, and various other examples are consistent with the spirit, and within the scope, of this disclosure.

DETAILED DESCRIPTION

This disclosure is directed to a system, method and computer-readable medium that provide for a new dynamic, context-specific power dormancy and management architecture. In various examples, this management architecture may be used particularly with virtualized Radio Access Networks (vRANs) that include physical layer functionality performed in a programming environment of a periphery, such as a peripheral component interconnect express (PCIe) expansion card.

Recent changes in the architecture of vRANs have moved the physical layer of the vRAN from primarily being performed at a processor of a computer instance to being performed on an expansion card. As a result, power consumption by the expansion card has increased substantially. Moreover, the expansion card has only a limited number of dormancy states and, as it must communicate via the processor of the CPU that has a low latency, the expansion card must generally remain active for most of the time even when the expansion card is underloaded, such as might be the case at night or other times. To address this issue, a new architecture is implemented at the vRAN in communication with a data center. A data center is a centralized grouping of computer resources, either physically or virtualized, for the processing, storage and distribution of data. The new architecture generates customized context-specific dormancy and power control policies that reflect actual power consumption across multiple vRANs and implements them at the vRANs. Unlike standard hierarchical PCIe power control mechanisms, power control policies in this architecture are not based on static logic, but rather on dynamically created and adjusted policy for a given network segment, thereby providing a platform for further innovation in power control. In this manner, the vRANs can become dormant in underloaded conditions and thereby reduce power consumption. Moreover, it should be understood that the power control policy described below may include the monitoring and control of parameters that control dormancy.

The architecture relies on the generation of optimized dormancy and power management policies for use by the vRANs based on updated data that is compiled from the vRANs. In an example, the overall architecture may include one or more of the following:

(1) a power control agent located in a programmable environment on an expansion card, such as a PCIe card, or other periphery coupled to the compute instance. PCIe cards provide an exemplary solution as an expansion card because, they use a serial bus expansion standard with a relatively high bandwidth, a high data transfer rate between a peripheral and a compute instance, and a low latency. The power control agent obtains data from the subcomponents in the programmable environment on the expansion card, correlates the data to at least a first power control policy stored at the expansion card, implements the correlated first power control policy on the expansion card, and facilitates communication of the selected correlation data and/or raw data to a non-transitory computer-readable medium at a data center from which it may then receive one or more new dynamic context-specific power control policies based at least in part on the correlation data and/or raw data communicated to the data center;

(2) a Power Control Policy Function resident on the computer-readable medium, such as at a data center, where data is obtained from the various vRAN infrastructure (i.e., compute instances and particularly the periphery coupled to the compute instances) and optimized power control policies for the vRANs are developed based on the data that has been obtained; and (3) an out of band management channel that allows for direct communication between the power control agent and the data center and is included both on the expansion card and elsewhere on the compute instance. This data may include recently collected data as well as historically collected data for the vRAN infrastructure. The data that is compiled and passed along to the base station for determining power policies may include, for example, data on load, power states (e.g., fully active, idle or standby, low power sleep, and off) and power consumption, which may be referred to collectively as power consumption data. The policies may take into account, for example, different usage patterns of the PCIe at different times of the day or on different days, actual and predicted loads, etc.

Each of these features may be implemented by a single entity or may be implemented by separate entities. For example, the policy control agent may be implemented by a first entity and the data center may be operated by a separate entity, while the out of band management channel may be separately operated or operated at least in part by one or more of the other entities.

I. Open vRAN Architecture

The advent of vRANs has revolutionized commercial, operational and technological aspects of RAN technology. This is especially significant as RANs form a substantial and most capital-intensive portion of mobile broadband infrastructure. Because vRANs, including the baseband functions of vRANs, are implemented on general purpose compute platforms, they are generally more cost-efficient from a hardware perspective than traditional RANs that are typically built by network equipment providers using their own proprietary technology.

While hardware costs may be reduced by using vRANs, predicting vRAN loads, power states and power consumption is difficult. This is because vRAN traffic is bursty, meaning that the traffic tends to occur in bursts at intervals. Power consumption by vRANs is easier to address during busy periods when the vRAN has a high load. However, the high load periods for vRANs are limited, e.g., about 10% of operational time of a vRAN. Most of the time, e.g., 90% of the time, vRAN infrastructure is underloaded—i.e., low load or idle conditions. It is desirable to reduce power consumption during underloaded conditions while maintaining a reasonable latency and jitter of vRAN traffic. As a practical matter, underloaded vRANs cannot frequently enter a predefined dormancy state to reduce power consumption as the vRANs need to meet reasonable latency requirements for the bursty traffic. Power consumption by the physical layer of a vRAN is of particular concern as the most demanding part of vRAN workload is the physical layer of baseband processing. The power consumption by the physical layer of a vRAN consumes more than half of overall compute resources and typically requires sub 10 μsec maximum system latency.

The main mechanism for adjusting power consumption of a compute system, such as is used with a vRAN, to lower loads are power control and dormancy of CPU and periphery. However, the vRAN workload is extremely sensitive to processing latency and jitter. Therefore, any dormancy or power control mechanism employed for optimization of power consumption should adhere to the stringent system latency and jitter targets.

Open vRAN hardware architecture has evolved under the 5G standard for mobile broadband networks. In one vRAN hardware architecture, a processor at a compute instance, such as the central processing unit (CPU) of a general purpose compute system, handles most of the processing of a physical layer of computer networking while one or more subordinate expansion cards, like PCIe cards, that are coupled to the compute instance handle a limited number of tasks. The CPU of the compute instance handles, for example, functions such as baseband channel coding and decoding and fronthaul and midhaul networking. Such functions and networking may include, for example, one or more of compression/decompression, scrambling/descrambling, modulation/demodulation, layer mapping (i.e., maps codewords to layers), UL (uplink) channel estimation, UL Equalization/IDFT (Inverse Discrete Fourier Transform), DL BF (downlink beamforming) weight calculation and precoding, or ORAN M/C/S (Open RAN Modulation and Coding Scheme). The limited set of physical layer functions that are offloaded to an expansion card may include, for example, a network and sync periphery, and an FEC offload periphery.

The network and sync periphery may be coupled to the CPU and used to provide fronthaul (FH), midhaul (MH) and sync functions and a network interface controller. The FEC offload PCIe periphery may also be coupled to the CPU of the compute instance, such as to the scrambling/descrambling functionality, and used to perform forward error correction (FEC). In some examples, one or more of the peripheries may include accelerators. The PCI peripheries may interface with data link layer 2 and network link layer 3 (L2/L3) of computer networking that are handled by the CPU. This architecture thus spreads the physical layer across the CPU of the compute instance and periphery and requires low latency interactions between the CPU and periphery.

Current power control and dormancy management of a typical general purpose compute system use standard power and dormancy control mechanisms for CPU processors (e.g., C-states, P-states of CPU) and standardized dormancy mechanisms of PCIe periphery (D-states, S-states, L-states). (C-state=idle, nothing executing; P-state=executing functions; D-state=device state; S-state=system state; L-state=link power state). However, given the stringent latency requirements of baseband physical layer processing, these standard mechanisms of dormancy and power control are not well suited to vRAN technology. This is because the latency and jitter impact of entering/exiting power control and dormancy states takes too long and exceeds the overall permissible latency (i.e., the latency budget). In practice, this means that the general purpose compute system that is processing a vRAN workload is locked into active high power states for both CPU and PCIe periphery, regardless of the presence of actual traffic to process. This contributes to a significant power consumption overhead in low and idle load scenarios.

II. Inline vRAN Next Generation Architecture Communicating with Data Center

In a next generation of vRAN architecture, the functions of the physical layer that were previously performed by one or more processors on the compute instance (e.g., by the CPU silicon) are moved to a PHY programmable environment on an expansion card on the compute instance. By isolating most of most latency sensitive processing within a single environment on the expansion card, the latency and jitter targets for the one or more processors of the compute instance (i.e., the CPU) are relaxed. The most latency sensitive part of vRAN stack is confined to a single compute environment on the expansion card and no longer requires the lowest latency interactions between CPU and the expansion card. This enables a more standard mechanism of power and dormancy control to the one or more processors of the compute instance (e.g., C-states, P-states), which allows for more flexibility to adjust power consumption by the one or more processors of the compute instance to the actual level of traffic.

With the entire PHY layer of processing offloaded from the CPU of the compute instance to one or more expansion cards that are coupled to the compute instance, power consumption by the expansion card has substantially increased and power consumption has also increased due to costs for cooling the expansion card. Much of the power increase is due to latency requirements for physical layer processing and the need for ongoing communications to pass between the expansion card and out of band processing via the CPU. The power controls and dormancy states currently in use were designed for expansion cards that performed far less functionality and do not account for this increase in power usage. The expansion card must therefore remain in more active high power states and cannot be allowed to go dormant for long, if at all. This causes a significant increase in power consumption and is wasteful, especially when the compute instances have only low and idle loading. It is, therefore, desirable to address power consumption issues in this newer vRAN architecture.

The main mechanisms of adjusting power consumption of a compute system to lower loads are power control and dormancy of CPU and periphery. However, the vRAN workload is extremely sensitive to processing latency and jitter. Therefore, any dormancy or power control mechanism employed for optimization of power consumption should adhere to stringent system latency and jitter targets.

III. Network of vRANs

FIG. 1 illustrates an overview diagram of a system that includes multiple vRANs in accordance with an example. In the illustrated example, system 100 comprises three vRANs 102, 104, 106 which may or may not be operated by the same entity. A power control agent may be implemented at each vRAN. Each vRAN includes a respective compute instance and may serve as a distributed unit (DU) of a vRAN. The vRANs also include a radio unit/transceiver (not shown) and a centralized unit (CU) (not shown). The vRANs 102, 104, 106 are implemented in a mobile network to wirelessly connect user equipment (UE) such as the illustrated mobile phones 110, 114 and other mobile-enabled equipment, such as laptop 112 with a core network 120 via link 107. For example, depending on their locations with the mobile network, mobile phone 102 may link to vRAN 102 via radio link 102a, mobile phone 106 may link to vRAN 106 via radio link 106a, and laptop 112 may link to vRAN 102 via radio link 102b. In this example, system 100 further includes a data center 124 where the Power Control Policy Function may be performed.

The vRANs may communicate with the data center 124 using an out of band management channel 103 and link 105. Out of band means that the connection uses a channel that is not used for the primary connection to the core network 120. Thus, FIG. 1 shows the out of band management channel 103 that is used to communicate between a vRAN, such as vRAN 102, and out of band wide area network (WAN) 122. Additional respective out of band management channels 103a and 103b may be provided to enable mobile communication between respective vRANs 104 and 106 via out of band WAN 122 and link 105 to data center 124. As is explained below with reference to FIG. 2, vRANs in system 100 may include elements of a respective OOB management channel.

In some examples, a data center is shared among vRANs, such as the data center 124 of FIG. 1 that may be shared among vRANs 102, 104, 106. This enables the compilation of data from multiple vRANs, the development of power control policies that account for power consumption data at multiple vRANs and, the sharing of the power control policies developed at the data center among one or more of the vRANs.

An example of a compute system on which the present invention may be implemented is an HPE ProLiant DL110 Server from the Hewlett Packard Enterprise Company of Spring, TX.

Figure 2:
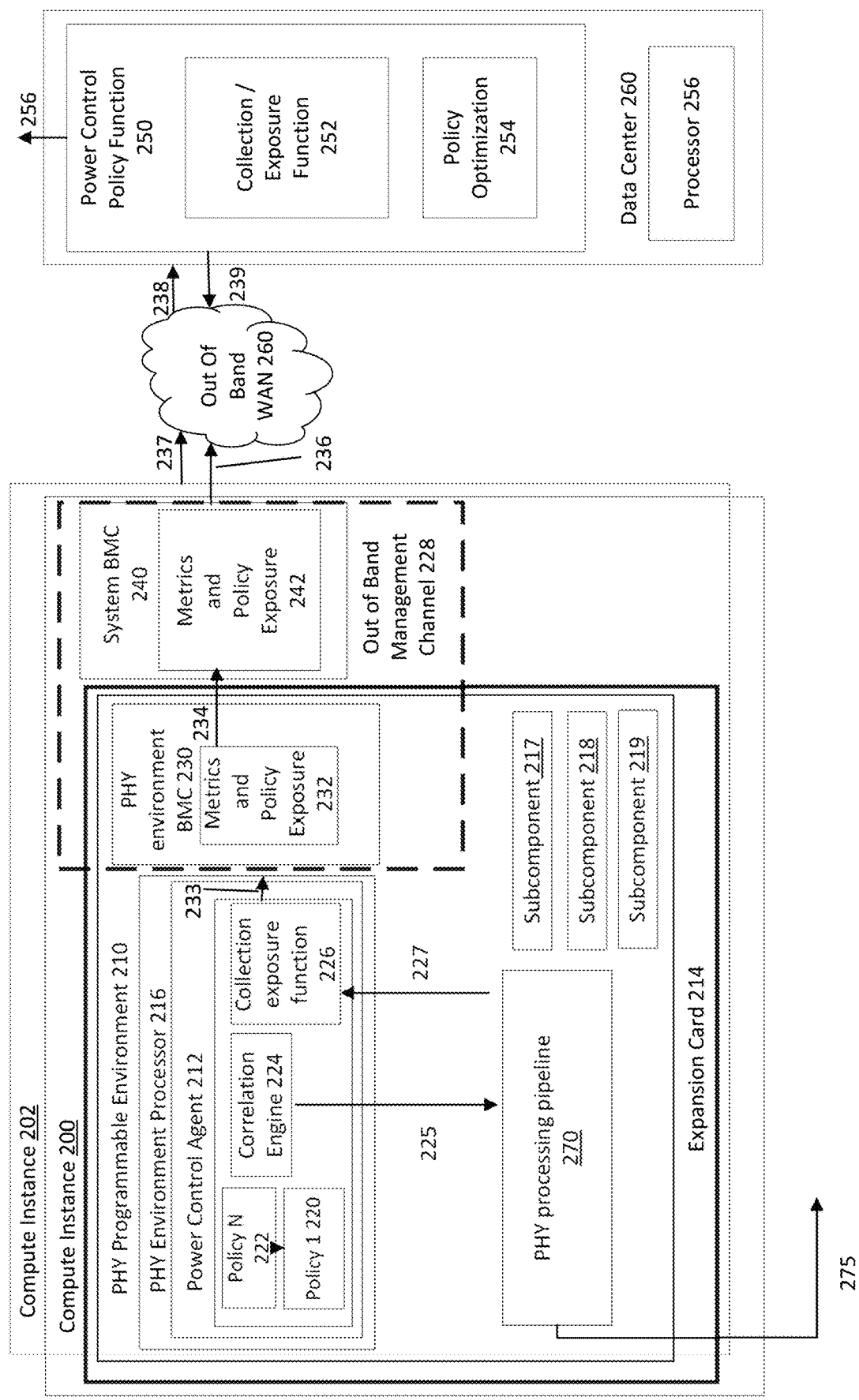
FIG. 2 illustrates a compute instance in communication with a data center for de-centralized dormancy management in accordance with an example.

FIG. 2 illustrates a decentralized dormancy and power management architecture for vRANs that reduces power consumption, particularly for vRANs having an inline architecture. In the example shown in FIG. 2, there are two vRANs using the decentralized dormancy and power management architecture, including compute instance 200 and compute instance 202. The PHY programmable environment 210 and the PHY environment BMC 230 are all implemented on an expansion card 214, such as on a PCIe card. Although only two vRANs are illustrated, it should be understood that there may be more than two vRANs. While the elements of only compute instance 200 are shown, it should be further understood that the elements of compute instance 202 may be similar.

As noted above, the decentralized dormancy and power management architecture that is shown in FIG. 2 includes three primary components: (1) a power control agent 212, (2) an out of band management channel 228 that may include a PHY environment baseboard management controller (BMC), an optional System BMC 240 where data passes over paths 234, 236, and an out of band wide area network (OOB WAN), and (3) a power control policy function 250. Out of band management channel 228 is denoted in FIG. 2 within a dashed box. Each of these elements is further described below Referring to the example of FIG. 2 in greater detail, a first compute instance 200 of a vRAN includes an expansion card 214 that includes a programmable environment 210 (e.g., a PHY programmable environment). Programmable environment 210 is a portion of expansion card 214 that is programmable with instructions that may be performed by a processor within the programmable environment. Programmable environment 210 may further include the system baseboard management controller (BMC) 240, which includes a special processor that is used to monitor the state of the expansion card and metrics and policies used and to communicate them to data center 260. System BMC may therefore be considered as part of the out of band management channel 228. PHY programmable environment 210 includes a PHY environment processor 216, a non-transitory computer-readable memory 214, a PHY environment BMC 230 which may be considered as part of the out of band management channel 228. Expansion card 214 may also include one or more subcomponents 217, 218, 219 that are needed to maintain the operation of the expansion card, such as, for example, a digital signal processor (DSP), a Radio Frequency System-on-Chip (RFSoC), heat sinks or capacitors, to name a few. The subcomponents may be within the PHY programmable environment 210 as shown or elsewhere on expansion card 214. PHY programmable environment 210 may further include a PHY processing pipeline 270 that performs non-power controlled functions and handles mobile traffic at 275. In this example, processing pipeline 270 is a way to characterize data being transmitted and processor via the pipeline. In embodiments, the PHY processing pipeline 270 may be provided by vendors other than the vendor of the decentralized dormancy and power management architecture.

Power control agent 212 operates autonomously within the PHY programmable environment 210 using PHY environment processor 216. It is autonomous in the sense that it operates without interacting with the processor of a compute instance, such as one of compute instances 200 or 202. Power control agent 212 includes one or more vRAN power control policies 220, 222 (shown as policy 1 and policy N), a correlation engine 224, and a collection/exposure function 226. Collection/exposure function 226 collects (compiles) via path 227 power consumption data,/metrics of load from internal subcomponents 217, 218, 219 of the PHY programmable environment 210 via path 227. The data that is compiled includes at least one of, but is not limited to, load, power consumption, power states, throughput, Resource Block utilization, DSP cores utilization and frequency, Radio Frequency System-on-Chip (RFSoC) utilization, silicon utilization, or networking chip utilization. Thus, for example, collection/exposure function 226 obtains the utilization of subcomponents and power consumption for use in determining whether, and for how long, to allow the system to go into a lower dormancy state or even an idle state if the utilization for that time period is low.

Power control agent 212 correlates the compiled power consumption data, using correlation engine 224, to a pattern of at least a first vRAN power control policy, selected from one of power control policies 220, 222 already located at the vRAN, that most closely correlates to the collected data. One existing power control policy may be, for example, that the expansion card may go idle after midnight if several measured utilization rates fall beneath a certain threshold. Another power control policy may focus on underutilization as well as power consumption such that if the power consumption is beneath a certain level but the utilization is above a second threshold, then a different dormancy policy may be set. The compiled data (metrics) will be compared by correlation engine 224 to the existing power control policies 220, 222 and correlation engine 224 will determine which power control policy to implement at the expansion card at that time.

Power control agent 212 applies the at least first power control policy to a set of policy-specific power and dormancy control settings to the power control function of the PHY programmable environment to execute power saving action in a PHY programmable environment. For example, settings that are based on the policy 220, if that policy is selected, are transmitted via path 225 to PHY processing pipeline 270. In some examples, the power control settings may include at least one of DSP frequency and voltage, RFSoC voltage, networking chip voltage, DSP core dormancy state, or RFSoC dormancy state, to name a few. Generally, as noted, the power control policy that is implemented may generally be selected so as to optimize power consumption, latency, the handling of actual and predicted loads, throughput, etc.

Compute instance 200 is communicatively coupled to data center 260. This means that either the raw data of the collected power consumption or correlation data that reflect the current power control policy that is implemented may be communicated may be communicated to data center 260 via the out-of-band management channel 228. At the data center 260, the compiled data is used by the Power Control Policy Function 250 which collects data from one or more vRANs and generates power control policies that may be transmitted back to one or more vRANs. Data center 260 may be, for example, centrally located to the vRANs such as at a base station.

It should be understood that while only a single PCIe expansion card is illustrated in FIG. 2, programming environment may include multiple expansion cards with similar policy control agents coupled to a single compute instance and in communication with the data center 260.

One way of implementing power control agent 212 is to load it onto the expansion card 214. The power control agent 212 may be included on the expansion card when sold or loaded onto the expansion card at a later time, possibly via a vRAN management software (not shown). In examples, fields relating to load parameters, power states, power consumption readings, and other data may be included with management software to compile the data and implement settings as needed.

The out of band management channel 228 may include the baseboard management controller (BMC) 230 of the PHY programmable environment 210, a system BMC 240 and a communication protocol, which may be an extension of OOB communication protocols. Out of band management channel 228 facilitates an exchange of granular information related to the power consumption data (which may include load and power states) and vRAN power control policies to the data center 260 that has the centralized Power Control Policy Function 254. An out of band communication protocol is a protocol that operates to communicate information via a separate channel from a main communication channel. A BMC is a specialized processor that monitors a physical state of hardware and communicates with a system administrator.

In the illustrated example in FIG. 2, data passing through out of band management channel 228 from power control agent 212 to data center 260 is first transmitted via path 233 to PHY environment BMC 230, then to System BMC 240 via path 234, and then wirelessly over path 236 to out of band WAN 260. From there, the data is transmitted wirelessly over path 238 to data center 260. Thus, system BMC 240 is located intermediate PHY environment BMC 230 and data center 260. Arrow 237 represents the load and power data (metrics) and the power control policy currently in use that are being transmitted to data center 260. In the reverse direction, power control policies are transmitted from data center 260 to power control 212 in the reverse direction starting at path 239 and heading through system BMC 240 to PHY environment BMC 230 and then to power control agent 212. Thus, the out of band management channel facilitates the exchange of information about (relating to) the obtained power consumption data and the vRAN power control policies.

Figure 6:
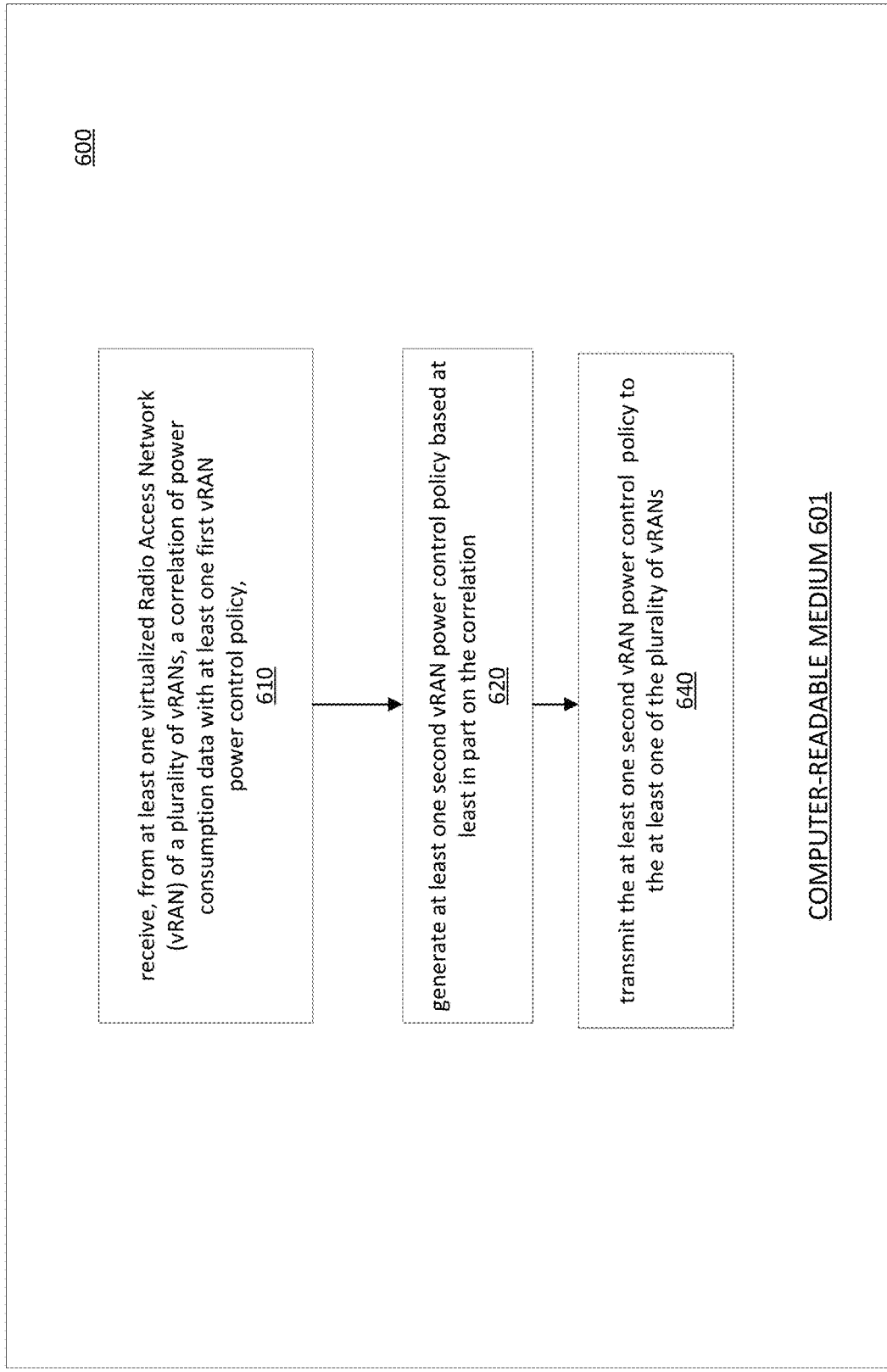
FIG. 6 illustrates a flow chart of steps of a vRAN power control policy function, such as on a computer-readable medium such as at a data center, in accordance with an example.

The Power Control Policy Function 250 at data center 260 may include at least two programmable functions for which instruction may be stored on a non-transitory computer readable medium, one example of which is illustrated in FIG. 6). These functions include a collection/exposure function 252 where data is obtained from the vRANs and a policy optimization function 254 where optimized power control policies are generated based at least in part on the data obtained from the vRANs. Data from the Power Control Policy Function 250 may be forwarded at 256 to a RAN service management and orchestration (SMO) platform for open RAN radio resources. Once one or more new power control policies are generated at data center 260, the policies are transmitted back to power control agent 212 via the out of band management channel 228 as described. Correlation engine may again determine which of the power control policies to apply by taking into account the newly received one or more policies. The new settings are then transferred via path 225 to the PHY processing pipeline 270, and any other element (not shown) that the power control policy is to control.

As shown, the PCI environmental processor 216 may perform the power control functions. Instructions to perform the functions of the power control agent 212 may be stored at least one non-transitory computer readable memory, e.g., persistent storage device and main memory device. One skilled in the art will note that the data center 260 at which the power control policy function is performed may further comprise other systems, subsystems, and/or components (e.g., a display, a keyboard, a mouse, speakers, buttons, batteries, fans, motherboards, power supplies, etc.) for implementing the various power policy functions described herein.

Figure 3:
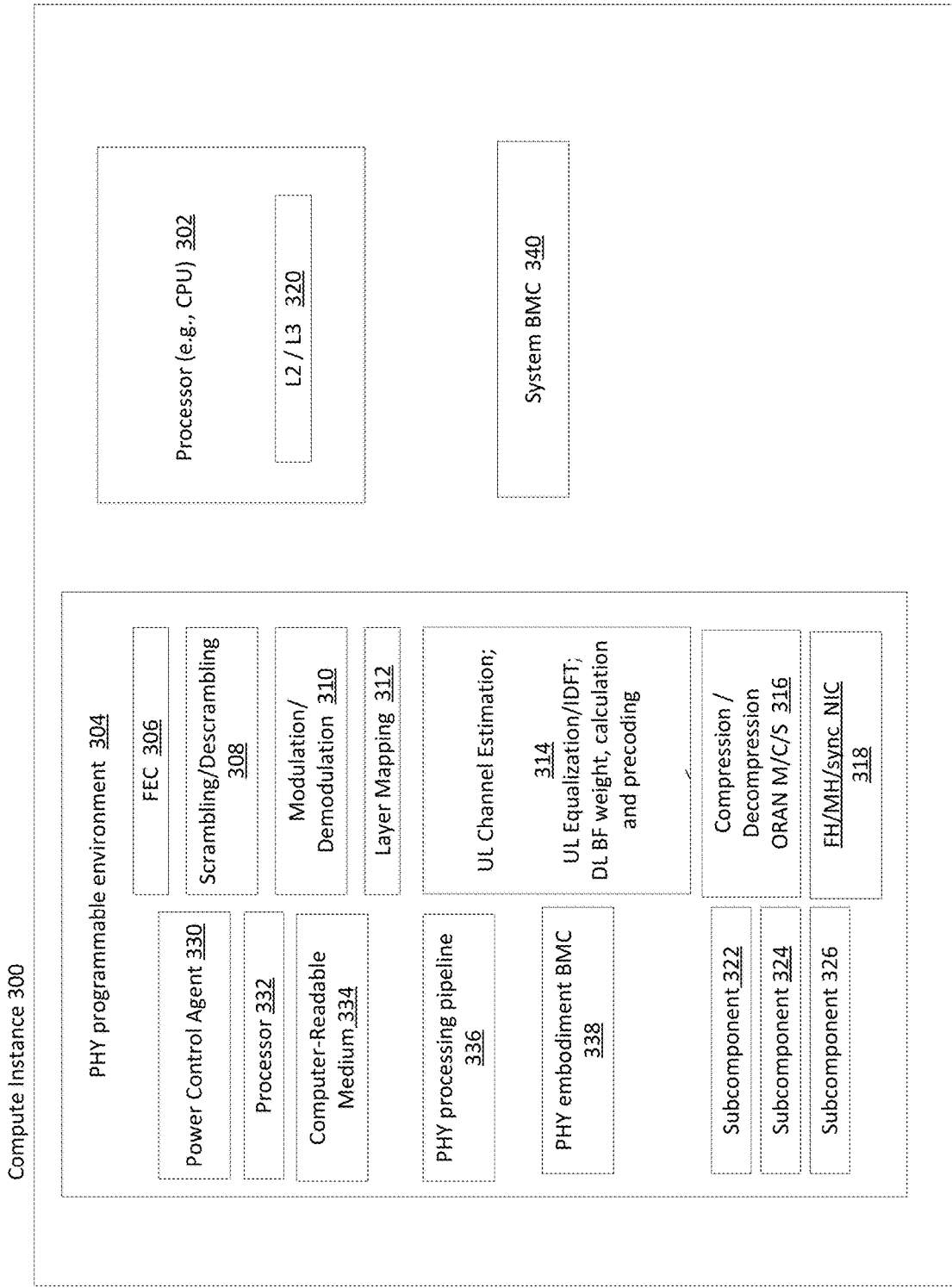
FIG. 3 illustrates an inline architecture for a vRAN compute instance in accordance with an example.

FIG. 3 illustrates additional details of a compute instance 300 with an inline architecture. In examples, processor 302 (e.g., CPU), may perform functions for layers 2 and 3 (L2/L3) 320. In this architecture, the PHY programmable environment 304 may include one or more processors, such as PHY environment processor 216, that performs one or more data processing techniques such as forward error correction (FEC) 306, scrambling/descrambling 308, modulation/demodulation 310, layer mapping 312, UL channel estimation, UL (uplink channel estimation), Equalization/Inverse Discrete Fourier transform (IDFT), and downlink beamforming (DL BF) weight, calculation and precoding, 314, compression/decompression and ORAN M/C/S 316 (Open RAN Modulation and Coding Scheme), and fronthaul (FH), midhaul (MH) and sync functions or a network interface controller (FH/MH/sync) and NIC 318. The bulk of these functions were performed in the prior art by the CPU of the computer instance. Examples of these techniques are known by those of ordinary skill in the art. The PHY programmable environment 304 may further include subcomponents 322, 323, 324, as well as a processor 330 and a computer-readable medium 332. Alternatively, subcomponents may exist on expansion card 214 outside of the PHY programmable environment 210. When compute instance 300 is enhanced with the dormancy and power control architecture shown and described with reference to FIG. 2, programmable environment 304 also includes a power control agent 320 similar to the power control agent shown in FIG. 2.

Figure 4:
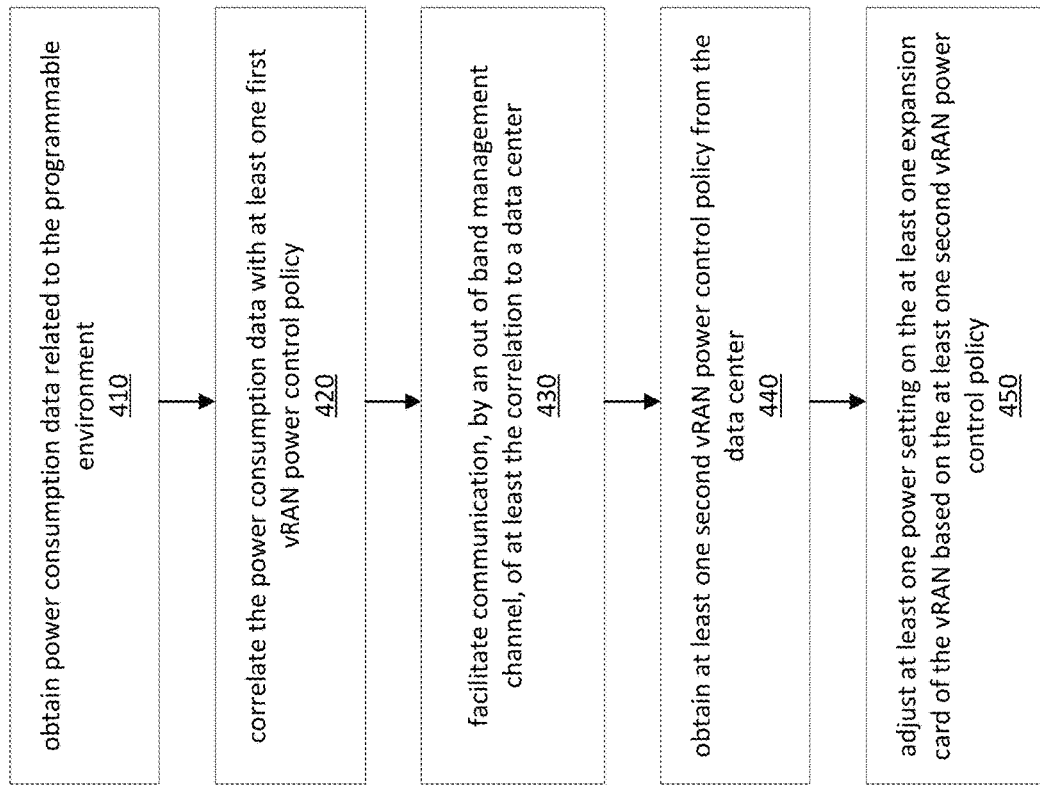
FIG. 4 illustrates a flow chart of steps performed by a power control agent operating on an expansion card of a vRAN in accordance with an example.

FIG. 4 illustrates a flow diagram 400 of a power control agent in the programming environment of the vRAN. In an example, the programming environment includes a processor that performs the follow steps.

At step 410, power consumption data, including load and power states, related to the programming environment, such as subcomponents shown in FIG. 2, is obtained. The power consumption data may include, for example, at least one of data related to load, power consumption, power states, throughput, Resource Block utilization, digital signal processor (DSP) cores utilization and frequency, Radio Frequency System-on-Chip (RFSoC) utilization, or networking chip utilization.

At step 420, the power consumption data is correlated to an at least one first power control policy, such as a policy resident in the memory of the programmable environment shown in FIG. 2. This power control policy may be the only power control policy initially stored at the programmable environment or there may be multiple power control policies stored at the programmable environment. The at least power control policy may be a default policy such as a standard power control policy (including dormancy) that is implemented at expansions cards, it may be a power control policy that was obtained from the data center, or it may be a power control policy that was otherwise obtained and is initially stored at the programmable environment.

The power consumption data is compared to settings for one or more policies to determine a correlation between the policy at the programmable environment that most closely correlates to the current power consumption, including actual power consumption, load and power states. For example, a first policy may set a dormancy to idle for a certain power consumption. The actual power consumption is compared to the policies and the policy closest to the actual circumstances is determined. Another power control policy with different dormancy parameters may be implemented where there is a higher power consumption by the components in the programmable environment. A data center may use the correlation data to generate power control policies.

At step 430, an out of band management channel facilitates communication of the correlation to a data center, such as the data center shown in FIG. 2. The data transmitted through the out of band communication channel may be, for example, the correlation data that correlates the power consumption to the policy. Using the data, data center may generate policies that differ from policies already in effect at a computer instance, such as at a compute instance shown in FIG. 2.

At step 440, at least one second vRAN power control policy is obtained from the data center. At step 450, the power control agent may adjust at least one power setting on the at least one expansion card of the vRAN based on the at least one second vRAN power control policy at a compute instance, such as a compute instance shown in FIG. 2. The at least one first and at least one second vRAN power control policies provide for an adjustment to at least one of the following: a DSP frequency and voltage, an RFSoC voltage, a networking chip voltage, a DSP core dormancy state, or an RFSoC dormancy state. In some examples, the at least one first and at least one second vRAN power control policies are dynamically created and adjusted for at least one segment of a telecommunications network. In other words, the policies are changed dynamically as warranted by the power consumption data, loads, power states, etc. and the adjustment is adjusted for at least one segment of vRANs in a telecommunications network.

A power control policy may include, for example, parameters, such for use by power control agent as shown in FIG. 2 to assess the current parameters, like power consumption, load, power states, or other variables, whether power-related or otherwise that the power control agent is to use in correlating the policy to current actual values. The policy further includes power settings to be implemented at an expansion card based on the chosen, correlated policy. For example, policies may differ depending on variables, such as time of day, week, or some other date or time.

Figure 5:
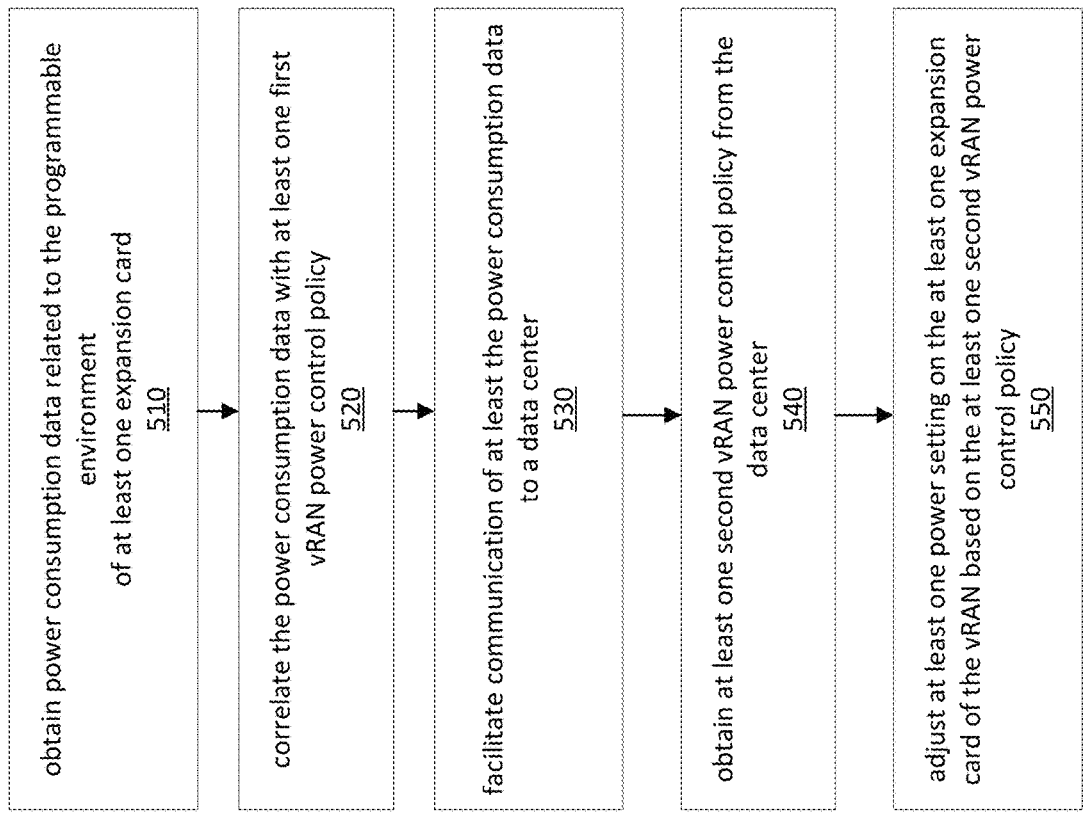
FIG. 5 illustrates a flow chart of steps performed by a power control agent operating on an expansion card of a vRAN in accordance with another example.

Another example of a flow diagram 500 is shown in FIG. 5. In this example, the out of band management channel may facilitate the communication of raw data such as power consumption data for the subcomponents is communicated to the data center. In this example, correlation may optionally be also communicated in addition to the power consumption data or may not be communicated. Thus, in the example of FIG. at step 510, power consumption data, including load and power states, related to the programming environment, such as data from subcomponents shown in FIG. 2, is obtained. At step 520, the power consumption data is correlated to an at least one first power control policy, such as a policy resident in the memory of the programmable environment 210 of FIG. 2. At step 530, an out of band management channel facilitates communication of at least the power consumption data to a data center. The data transmitted through the out of band communication channel may be, for example, the correlation data that correlates the power consumption to the policy. Using the data, the data center may generate policies that differ from policies already in effect at a computer instance, such as at computer instance shown in FIG. 2. At step 540, at least one second vRAN power control policy is obtained from the data center. Next, at step 550, the power control agent may adjust at least one power setting on the at least one expansion card of the vRAN based on the at least one second vRAN power control policy at a compute instance, such as a compute instance shown in FIG. 2.

In both of the examples shown in FIG. 4 and FIG. 5, data center may formulate policies based on the received correlation data and/or raw data supplied to the data center.

FIG. 6 shows a flow diagram 600 of steps that may be performed at a data center such as a data center shown in FIG. 2. FIG. 6 is shown from the perspective of exemplary actions performed at the data center. In examples, the instructions for performing the steps of the flow diagram are stored on a computer-readable medium 601. At step 610, a correlation of power consumption data with at least one first vRAN power control policy is received from at least one vRAN of a plurality of vRANs. (See, e.g., a collection/exposure function in FIG. 2). The power consumption data relates to the programmable environment on an at least one expansion card at the at least one vRAN (e.g., the PCIe card). The power consumption data may also include the load and power states at the at least one expansion card.

At step 620, at least one second vRAN power control policy is generated based at least in part on the correlation of the power consumption data with the at least one first vRAN power control policy. (See, e.g., data is obtained from the vRANs and a policy optimization function shown in FIG. 2). At step 640, the at least one second vRAN power control policy is transmitted to at least one of the plurality of vRANs. Additional vRAN power control policies may also be generated in addition to the at least one second vRAN power control policy.

In the example described with respect to FIG. 6, the at least one expansion card may be coupled to a compute instance at the at least one vRAN, and the expansion card at the at least one vRAN may be configured to communicate outside of the compute instance without accessing a CPU of the compute instance.

In an alternative example, the power consumption data may be received at step 610 in lieu of or in addition to correlation data and may be used at step 620 to generate the at least one second VRAN power control policy.

With the power control policies formulated at the data center customized to current circumstances in the vRANs, the power dormancy and management architecture described herein allows for power consumption for the vRANs to be customized and context sensitive. Thus, the power control policies that are available at the programming environment are suited to latency and jitter requirements at the one or more vRANs in communication with the data center and are not just a few predefined power control policies that are more appropriate to a programming environment at the expansion card where there is a lower load placed on the expansion card. Moreover, unlike standard hierarchical PCIe power and dormancy control mechanisms, the architecture puts a power control decision making and enforcement mechanism inside the PHY processing environment itself. The architecture also does not require any interaction of the power control and dormancy control mechanisms with a processor of a compute instance, such as the CPU of a general purpose compute system CPU. This achieves the required latency in power control mechanisms in reaction to traffic load.

Figure 7:
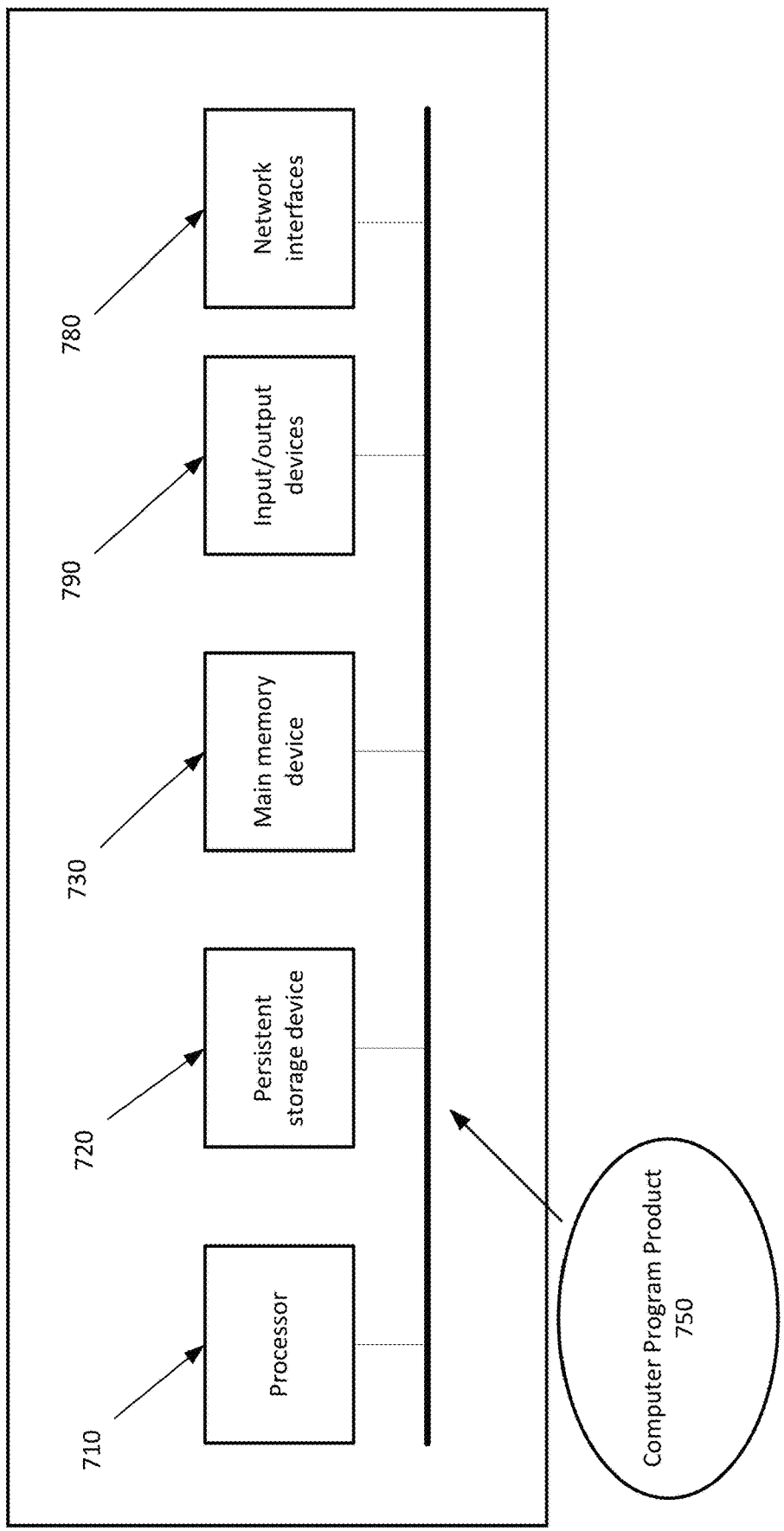
FIG. 7 illustrates a block diagram of a distributed computer system that can be used for implementing one or more aspects of the various examples.

In addition, the architecture described herein allows the power control data to be shared via an out of band management channel, thereby enabling collection of this data at massive scale to further optimize power control policies that correspond to the realities of a traffic profile in a concrete network segment A high-level block diagram of an exemplary system that may be used to implement systems and methods described herein is illustrated in FIG. 7. System 700 is one example of an expansion card. System 700 comprises a processor 710 operatively coupled to a persistent storage device 720 and a main memory device 730. In examples, processor 710 is located on an expansion card 214. Processor 710 controls the overall operation of system 700 by executing computer program instructions that define such operations. The computer program instructions may be stored in persistent storage device 720, or other computer-readable medium, and loaded into main memory device 730 when execution of the computer program instructions is desired. Thus, the method steps of FIGS. 4, 5, and 6 can be defined by the computer program instructions stored in main memory device 730 and/or persistent storage device 720 and controlled by processor 710 executing the computer program instructions. For example, the computer program instructions can be implemented as computer executable code programmed by one skilled in the art to perform one or more algorithm defined by the method steps of FIGS. 4, 5 and 6. Accordingly, by executing the computer program instructions, the processor 710 executes an algorithm defined by the method steps of FIGS. 4, 5, and 6. Additionally, or alternatively, instructions for implementing the method steps of FIGS. 4, 5 and 6 in accordance with disclosed examples may reside in computer program product 750. When processor 710 is executing the instructions of computer program product 750, the instructions, or a portion thereof, are typically loaded into main memory device 730 from which the instructions are readily accessed by processor 710.

System 700 or devices coupled thereto may also include one or more network interfaces 780 that may be used to communicate with a data center to obtain policy information. System 700 may also include one or more input/output devices 790 that enable user interaction with system 700 (e.g., a display, a keyboard, a mouse, speakers, buttons, etc.).

Processor 710 may include both general and special purpose microprocessors and may be the sole processor or one of multiple processors of system 700. Processor 710 may comprise one or more central processing units (CPUs), and one or more graphics processing units (GPUs), which, for example, may work separately from and/or multi-task with one or more CPUs to accelerate processing, e.g., for various image processing applications described herein. Processor 710, persistent storage device 720, and/or main memory device 730 may include, be supplemented by, or incorporated in, one or more application-specific integrated circuits (ASICs) and/or one or more field programmable gate arrays (FPGAs).

Persistent storage device 720 and main memory device 730 each comprise a tangible non-transitory computer readable storage medium. Persistent storage device 720, and main memory device 730, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 790 may include peripherals, such as a printer, scanner, display screen, etc. that are coupled to the system 700. For example, input/output devices 790 may include a display device such as a cathode ray tube (CRT), plasma or liquid crystal display (LCD) monitor for displaying information (e.g., a DNA accessibility prediction result) to a user, a keyboard, and a pointing device such as a mouse or a trackball by which the user can provide input to system 700.

Any or all of the systems discussed herein may be performed by, and/or incorporated in a system such as system 700. Further, system 700 may utilize one or more neural networks or other deep-learning techniques to the systems and methods described herein.

One skilled in the art will recognize that an implementation of an actual computer or computer system may have other structures and may contain other components as well (e.g., batteries, fans, motherboards, power supplies, etc.), and that FIG. 7 is a high-level representation of some of the components of such a computer for illustrative purposes.

One should appreciate that the disclosed techniques provide many advantageous technical effects including improving the power consumption by generating context-sensitive dormancy and control policies. It should also be appreciated that the following specification is not intended as an extensive overview, and as such, concepts may be simplified in the interests of clarity and brevity.

The elements illustrated in FIGS. 1 and 2, and the various functions attributed to each of the elements, while exemplary, are described as such solely for the purposes of ease of understanding. One skilled in the art will appreciate that one or more of the functions ascribed to the various elements may be performed by any one of the other elements, and/or by an element (not shown) configured to perform a combination of the various functions. Therefore, it should be noted that any language directed to a programming environment of a compute instance, a client device, a power control policy function, at least one processor, a non-transitory (or persistent) storage device, or a main memory device should be read to include any suitable combination of computing devices, including servers, interfaces, systems, databases, agents, peers, controllers, or other types of computing devices operating individually or collectively to perform the functions ascribed to the various elements. Further, one skilled in the art will appreciate that one or more of the functions of the system of FIG. 1 described herein may be performed within the context of a client-server relationship, such as by one or more servers, one or more client devices (e.g., one or more user devices) and/or by a combination of one or more servers and client devices.

Systems and methods described herein may be implemented using a computer program product tangibly embodied in an information carrier, e.g., in a non-transitory machine-readable storage device, for execution by a programmable processor; and the method steps described herein, including one or more of the steps shown in FIGS. 4, 5, and 6, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

The various examples have been described with reference to the accompanying drawings, which form a part hereof, and which show, by way of illustration, specific ways of practicing the examples. This specification may, however, be embodied in many different forms and should not be construed as being limited to the examples set forth herein; rather, these examples are provided so that this specification will be thorough and complete, and will fully convey the scope of the examples to those skilled in the art. Among other things, this specification may be embodied as methods or devices. Accordingly, any of the various examples herein may take the form of an entirely hardware example, an entirely software example or an example combining software and hardware aspects. The following specification is, therefore, not to be taken in a limiting sense.

Throughout the specification and claims, the following terms take the meanings explicitly associated herein, unless the context clearly dictates otherwise:

The phrase "in an example" as used herein does not necessarily refer to the same example, though it may. Thus, as described below, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the discussion, references to servers, services, interfaces, clients, peers, portals, platforms, or other systems formed from computing devices. is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer or compute instance should be read to include any suitable computing device or combination of computing devices, including, for example, one or more servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed system. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative and exemplary, but not restrictive, and the scope of the examples disclosed herein is not to be determined from the specification, but rather from the claims as interpreted according to the full breadth permitted by the patent laws. It is to be understood that the examples shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

We claim:

1. A system comprising:
   a virtualized Radio Access Network (vRAN), wherein the vRAN comprises:
   a compute instance comprising at least one processor; and
   at least one expansion card coupled to the compute instance, the at least one expansion card comprising a programmable environment configured for communication without accessing the at least one processor of the compute instance, the programmable environment comprising:
   a power control agent configured to:
   obtain power consumption data related to the programmable environment;
   correlate the power consumption data with at least one first vRAN power control policy;
   facilitate communication, by an out of band management channel, of at least the correlation to a data center, wherein the data center is configured to generate vRAN power control policies for a plurality of vRANs;
   obtain at least one second vRAN power control policy from the data center, wherein the at least one second vRAN power control policy is based at least in part on the correlation; and
   adjust at least one power setting on the at least one expansion card of the vRAN based on the at least one second vRAN power control policy.

2. The system of claim 1, wherein the at least one expansion card is a peripheral component interconnect express (PCIe) card.

3. The system of claim 1, wherein the power consumption data includes at least one of data related to load, power consumption, power states, throughput, Resource Block utilization, digital signal processor (DSP) cores utilization and frequency, Radio Frequency System-on-Chip (RFSoC) utilization, or networking chip utilization.

4. The system of claim 1, wherein the power control agent facilitates communication with the data center via an out of band management channel, and wherein the out of band management channel comprises a baseboard management controller (BMC) and a communication protocol facilitating an exchange of information relating to the obtained power consumption data and the vRAN power control policies.

5. The system of claim 4, further comprising a second BMC on the compute instance that is located intermediate the BMC and the data center.

6. The system of claim 1, wherein the compute instance is communicatively coupled to the data center.

7. The system of claim 1, wherein the at least one first and at least one second vRAN power control policies provide for an adjustment to at least one of the following: a DSP frequency and voltage, an RFSoC voltage, a networking chip voltage, a DSP core dormancy state, or an RFSoC dormancy state.

8. The system of claim 1, wherein the at least one first and at least one second vRAN power control policies are dynamically created and adjusted for at least one segment of a telecommunications network.

9. The system of claim 1, wherein the at least one second vRAN power control policy is shared among the plurality of vRANs.

10. The system of claim 1, wherein the programmable environment is configured to include a PHY processing pipeline where non-power controlled functions are performed.

11. A method comprising:
   obtaining, at a virtualized Radio Access Network (vRAN) via a power control agent, power consumption data relating to a programmable environment of at least one expansion card coupled to a compute instance without accessing an at least one processor of the compute instance;

correlating the power consumption data with at least one first vRAN power control policy;

facilitating communication of at least the power consumption data to a data center, wherein the data center is configured to generate vRAN power control policies for a plurality of vRANs;

obtaining, from the data center, at least one second vRAN power control policy, wherein the at least one second vRAN power control policy is based at least in part on the power consumption data; and adjusting, by the power control agent, at least one power setting on the at least one expansion card of the vRAN based on the at least one second VRAN power control policy.

12. The method of claim 11, wherein the at least one expansion card is a peripheral component interconnect express (PCIe) card.

13. The method of claim 11, wherein the power consumption data includes at least one of data related to load, power consumption, power states, throughput, Resource Block utilization, digital signal processor (DSP) cores utilization and frequency, Radio Frequency System-on-Chip (RFSoC) utilization, or networking chip utilization.

14. The method of claim 11, wherein an out of band management channel facilitates communication with the data center, and wherein the out of band management channel comprises a baseboard management controller (BMC) and a communication protocol facilitating an exchange of information relating to at least one of power consumption data and vRAN power control policies.

15. The method of claim 14, wherein the out of band management channel further comprises a second BMC on the compute instance that is located intermediate the BMC and the power control agent.

16. The method of claim 11, wherein the at least one first and at least one second vRAN power control policies comprise an adjustment to at least one of the following: a DSP frequency and voltage, an RFSoC voltage, a networking chip voltage, a DSP core dormancy state, or an RFSoC dormancy state.

17. The method of claim 11, wherein the at least one first and at least one second vRAN power control policies are dynamically created and adjusted for at least one segment of a telecommunications network, and wherein the at least one second vRAN power control policy is shared among the plurality of vRANs.

18. The method of claim 11, further comprising performing, by the compute instance, non-power controlled functions via a PHY processing pipeline.

19. A non-transitory computer-readable medium comprising:

computer-readable instructions which, when executed by at least one processor coupled to at least one memory, cause the at least one processor to:

receive, from at least one virtualized Radio Access Network (vRAN) of a plurality of vRANs, a correlation of power consumption data with at least one first vRAN power control policy, wherein the power consumption data relates to a programmable environment on an at least one expansion card at the at least one vRAN;

generate at least one second vRAN power control policy based at least in part on the correlation; and transmit the at least one second vRAN power control policy to the at least one of the plurality of vRANs.

20. The non-transitory computer-readable medium of claim 19, wherein the at least one expansion card is coupled to a compute instance at the at least one vRAN, and wherein the expansion card at the at least one vRAN is configured to communicate outside of the compute instance without accessing a CPU of the compute instance.

* * * * *